US009249344B2

(12) United States Patent
Van Wijkschmitz et al.

(10) Patent No.: US 9,249,344 B2
(45) Date of Patent: Feb. 2, 2016

(54) PRESSURE SENSITIVE ADHESIVE COMPOSITION AS WELL AS A METHOD OF APPLYING IT AND A METHOD FOR THE PREPARATION THEREOF

(75) Inventors: Kerstin Ursula Van Wijkschmitz, Arnhem (NL); Martijn Johannes Verhagen, Arnhem (NL); Martinus Rutgers, Zutphen (NL); Evert Smit, WJ Zwolle (NL); Gerrit Hendrik Brunsveld, Zutphen (NL)

(73) Assignee: Henkel AG & Co. KGaA, Duesseldorf (DE)

( * ) Notice: Subject to any disclaimer, the term of this patent is extended or adjusted under 35 U.S.C. 154(b) by 1898 days.

(21) Appl. No.: 11/884,995

(22) PCT Filed: Feb. 27, 2006

(86) PCT No.: PCT/NL2006/000102
§ 371 (c)(1),
(2), (4) Date: Apr. 15, 2010

(87) PCT Pub. No.: WO2006/091088
PCT Pub. Date: Aug. 31, 2006

(65) Prior Publication Data
US 2010/0190918 A1 Jul. 29, 2010

(30) Foreign Application Priority Data
Feb. 25, 2005 (NL) ..................................... 1028411

(51) Int. Cl.
*C09J 133/14* (2006.01)

(52) U.S. Cl.
CPC ............ *C09J 133/14* (2013.01); *C08L 2312/00* (2013.01)

(58) Field of Classification Search
CPC ............................ C09J 133/14; C08L 2312/00
USPC .................... 524/81, 543, 553, 555, 556, 560
See application file for complete search history.

(56) References Cited

U.S. PATENT DOCUMENTS

| | | | |
|---|---|---|---|
| 3,769,254 A | 10/1973 | Anderson et al. | |
| 4,124,551 A | 11/1978 | Mathai et al. | |
| 4,234,660 A | 11/1980 | McKenna, Jr. et al. | |
| 5,068,291 A | 11/1991 | Gallaway et al. | |
| 5,616,670 A * | 4/1997 | Bennett et al. ............ | 526/307.7 |
| 5,683,798 A * | 11/1997 | Bennett et al. ............ | 428/312.6 |
| 5,728,767 A | 3/1998 | Kanetou et al. | |
| 6,214,931 B1 * | 4/2001 | Segers et al. .................... | 525/34 |
| 6,384,102 B1 | 5/2002 | Moens et al. | |
| 6,552,118 B2 * | 4/2003 | Fujita et al. ................... | 524/588 |
| 6,586,097 B1 | 7/2003 | Pascault et al. | |
| 6,683,147 B2 * | 1/2004 | Wigdorski et al. ........ | 526/329.6 |
| 2001/0031837 A1 | 10/2001 | Perez et al. | |
| 2004/0182512 A1 * | 9/2004 | Matsumoto ................... | 156/326 |
| 2006/0057366 A1 | 3/2006 | Husemann et al. | |

FOREIGN PATENT DOCUMENTS

| | | |
|---|---|---|
| EP | 0842960 A1 | 5/1998 |
| EP | 1036834 A1 | 9/2000 |
| GB | 2240548 A | 8/1991 |
| JP | 58208361 A | 12/1983 |
| WO | 03064552 A1 | 8/2003 |

OTHER PUBLICATIONS

Czech et al, Materials Science-Poland, v. 23, No. 4, 2005.*
Chu, S.G. Handbook of pressure Sensitive Adhesive Technology, D. Satas, Ed., Van Nostrand Reinhold Co., New York (1989).
"Self Adhesive Labels Laminates," FINAT Technical Handbook, 4th edition, 1995.
Shixue, Li et al. "Preparation and Use of Adhesives", Tianjin Science and Technique Press, Aug. 1998, pp. 16-17.
Shiyuan, Cheng et al."Handbook for Production and Application of Adhesives," Chemical Industry Press, Apr. 2003, pp. 34-35.
"Pressure Sensitive Laminates Suppliers and Users Technical Manual," FINAT Suppliers and users technical manual, 1980.
Yang, W. et al. "Dispersion copolymerization of styrene and glycidyl methacrylate in polar solvents," Colloid Polym. Sci., Springer-Verlag, vol. 277, issue 5, 1999, pp. 446-451.

\* cited by examiner

*Primary Examiner* — Irina Krylova
(74) *Attorney, Agent, or Firm* — Sun Hee Lehmann

(57) ABSTRACT

The present invention relates to a pressure sensitive adhesive composition comprising a copolymer having cross-linkable epoxy groups as well as a solvent. The copolymer is made up of one or more first, second and third monomers, wherein the first monomer possesses an epoxy group and third monomer has a bulky side chain. Surprisingly, the third monomer provides for stability without affecting the ability of the copolymer to form cross-links. The invention also relates to a method of preparing the pressure sensitive adhesive composition and to a method of its use.

1 Claim, No Drawings

PRESSURE SENSITIVE ADHESIVE COMPOSITION AS WELL AS A METHOD OF APPLYING IT AND A METHOD FOR THE PREPARATION THEREOF

The present invention relates to a pressure sensitive adhesive composition based on i) a copolymer comprising at least 2 monomers each independently of each other chosen from optionally substituted a) alkyl(meth)acrylate, b) aryl(meth)acrylate, c) vinyl alkanoate and d) vinyl lactam; and ii) a solvent, wherein the copolymer is cross-linkable.

A pressure sensitive adhesive composition according to the pre-amble has to meet conflicting requirements. Although it is essential that adequate cross-linking can be achieved because the final strength of the PSA is correlated with its molecular weight, this cross-linking may only occur at a desired moment, and not during production, transport or storage because a premature cross-linking would result in an increase in viscosity that would make it harder or even impossible to handle the pressure sensitive adhesive (PSA).

The object of the present invention is to provide a stable pressure sensitive adhesive composition allowing improved cross-linking, at a desired moment, and meeting the conflicting requirements to a large extent.

To this end, the adhesive composition according to the present invention is characterized in that the copolymer is a copolymer formed by co-polymerisation of 1) a first monomer chosen from a) and b) as defined above, said first monomer having a side chain comprising an epoxy group, 2) a second monomer chosen from a) to d) as defined above, said second monomer having a side chain not comprising an epoxy group, and 3) a third monomer chosen from a) and b) as defined above, said third monomer being a (meth)acrylate monomer having a bulky side chain, said (meth)acrylate monomer having the general formula (I):

$$H_2C=C(R^1)C(O)O-L-B \quad (I)$$

wherein
$R^1$ is H or $CH_3$;
L represents a linker;
B is a ring system having 1 to 5 $C_5$-$C_8$ rings, wherein rings may be independently of each other aliphatic and aromatic, optionally fused and optionally bridged, wherein in an aliphatic ring or rings 1 unsaturated bond may be present and each aliphatic ring may optionally contain 1 to 4 non-adjacent oxygen atoms, wherein each ring of the ring system, independently, may be substituted with 1 to 8 substituents $R^2$ chosen from optionally branched $C_1$-$C_6$ alkyl, optionally branched $C_1$-$C_6$ alkoxy, and nitrile, wherein any aromatic ring or rings, independently of each other, may be substituted with one or more groups, independently chosen from $R^2$ as defined above and a halogen atom,
wherein the molar ratio M13 between the first (meth)acryl monomer comprising a cross-linkable epoxy group and the third (meth)acryl monomer comprising a bulky side-chain is in the range of 0.1 to 5.

Surprisingly it has been found that such an adhesive composition meets the various requirements and displays excellent cross-linking properties. In addition, and if desired, the solids-content of the adhesive composition may be higher are than usual, allowing faster process operation at the customer, and offers environmental advantages because less solvent is needed. The adhesive composition according to the invention displays an acceptable stability during storage, even at solids-contents at which known adhesive compositions show unacceptable cross-linking. The pressure sensitive adhesive composition according to the invention is a copolymer solution, that is, the solvent is a solvent in which the copolymer is dissolved, and remains dissolved as long as little or no cross-linking occurs as evidenced by the absence of the formation of a gel. The term "independently of each other chosen" includes the possibility that the (at least) 2 monomers are chosen from the same category, for example both from category a). In the present application the halogen atom is chosen from chloro, bromo, iodo or fluoro, and is preferably chloro. The length and nature of the linker L is not very critical, although generally long linkers are not preferred. Linkers with a backbone length of 10 atoms or less are preferred. In case the linkers are relatively long, lower values for M13 may be required for optimum stability. L may also represent a single bond. Where in the present application reference is made to poly(meth)acrylate, this is understood to mean a polyacrylate, a poly methacrylate or a copolymer of methacrylate- and acrylate monomers. In connection with monomer, (meth)acrylate indicates as desired an acrylate- or methacrylate-monomer. A poly(meth)acrylate (copolymer) according to the invention will usually contain up to 55 mole % of vinyl monomer (that is, from 0 to 55 mole % of vinyl monomer), but will, in practice, contain significantly less (such as less than 25 mole %) or no vinyl monomer at all. Examples of suitable vinyl monomers are vinyl acetate and n-vinylpyrrolidone. A copolymer in the adhesive composition according to the invention customarily has a molecular weight Mz in the range of 50,000 to 1,500,000 Da, more customarily 275,000 to 1,500,000 Da. Here Mz is the double mass-averaged molecular weight such as determined using gel permeation chromatography, as disclosed in the examples. In the adhesive composition according to the invention the second monomer (which does not contain an epoxy group) is not critical and is present to provide the adhesive composition with other desired properties, such as to provide high adhesive strength. While the specific choice of the second monomer is not particularly critical, its presence is important, as the second monomer confers the copolymer a low Tg, without which the copolymer couldn't serve as a PSA. The second monomer is present in a percentage of, for example, at least 60 mole %, preferably at least 70 mole %, such as 60 to 96 mole %, more preferably in the range of 70 to 90 mole % relative to the total of monomers of the copolymer. A suitable second monomer is, for example, of the formula (II)

$$CH_2=C(R^3)C(O)OR^4 \quad (II)$$

but is not restricted to that formula, wherein:
$R^3$ is H or $CH_3$, and
$R^4$ is H, an optionally branched ($C_{1-18}$) alkyl group, which optionally is substituted with 1 or more hydroxy groups, wherein 1 or more non-adjacent carbon atoms may be replaced with amide or an oxygen atom.

Preferably the number of carbon atoms of $R^4$ is 1 to 10, more preferably 1 to 8, such as 1 to 6. Examples of suitable compounds are 2-ethylhexyl acrylate, butyl acrylate, acrylic acid, 2-hydroxyethyl acrylate, methyl acrylate, methyl methacrylate, 2-(2-ethoxyethoxy)ethyl acrylate, acryl amide, iso-octyl acrylate, and lauryl acrylate.

An adhesive composition comprising epoxy-groups was commercially available under the trademark Duro-Tak 280-2630. The copolymer comprised methyl acrylate, acrylic acid, 2-ethylhexyl acrylate and 0.93 mole % of glycidyl methacrylate (GMA). The epoxy groups contribute to the good adhesion-properties of the glue. However, the adhesive composition was found to be unstable (gel-formation within a few days, or even during production) and was withdrawn from the market.

U.S. Pat. No. 6,586,097 discloses in example 5 a copolymer in the form of crosslinked microparticles. The use of the compounds as an adhesive is also disclosed, but no example appears to be given. The compounds are present as micro particles, and by their nature are not dissolved in a solvent. The copolymer of example 5 is not a pressure sensitive adhesive, as the glass transition temperature (Tg) of this copolymer is 61° C. To be a PSA, a PSA has to have a Tg of 0° C. or less (see: Chu, S. G. Handbook of Pressure Sensitive Adhesive Technology, D. Satas, Ed., Chapter 8, Van Nostrand Reinhold Co., New York (1989)).

GB 2 240 548 discloses a cross-linkable liquid crystal terpolymer for use as an additive in structural (two-component) epoxy adhesives. The terpolymer is not suitable for use in a pressure sensitive adhesive because the proportion of second monomer is too low to provide a glass transition temperature of a PSA.

EP 0 842 960 relates to a radiation-curable liquid resin composition. Example 100 of this publication discloses a terpolymer comprising glycidyl methacrylate and a bulky monomer. The terpolymer is not suitable for use in a pressure sensitive adhesive because the proportion of second monomer is too low to provide a glass transition temperature of a PSA.

Various manufacturers supply adhesive compositions wherein cross-linking can be induced. Such adhesive compositions are often advertised by the manufacturer as a single component system. From the point of view of the user this is correct. He can apply the adhesive composition directly, without mixing with another component, onto the desired substrate, following which a cross-linking reaction is performed. However, such a single component system should actually be considered a mixture that contains, apart from a chemically essentially inert solvent, at least two active components, i.e.:
  a cross-linkable poly(meth)acrylate; and
  an additive for cross-linking (cross-linking agent).

To achieve cross-linking the poly(meth)acrylate in the known adhesive composition comprises side groups capable of chelating the additive, which is a metal ion. In this way links between different poly(meth)acrylate-chains are formed; in other words, cross-links are established. Cross-linking by forming chelates has several disadvantages. For example these cross-links are weak, reversible and sensitive to ambient conditions, such as water and often-used solvents such as alcohols.

According to a preferred embodiment, the molar ratio M13 is in the range between 0.2 and 1.5, and preferably between 0.3 and 1.

Such an adhesive composition has an increased shelf-life. The molar ratios indicated above are in particular recommended for adhesive compositions having an elevated mole percentage of epoxy groups in the copolymer (more than 1 mole %), and adhesive compositions comprising a relatively high percentage of solids (copolymer), such as more than 50 wt./wt. %. A molar ratio M13 of 2.9 or less and in particular 1.45 or less is often advantageous for outstanding stability.

According to a further preferred embodiment the third (meth)acryl monomer comprising a bulky side-chain possesses a ring system B, wherein B is a ring system the backbone of which is chosen from:

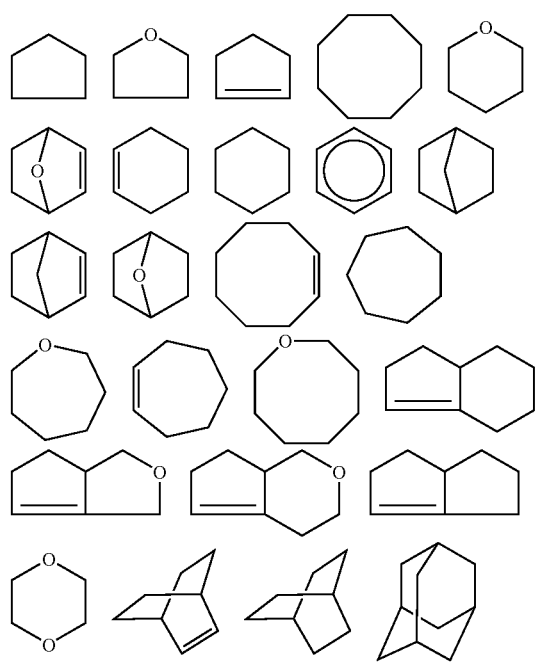

The bulky side chain-comprising (meth)acryl monomer has preferably a ring system B that comprises at least 1 aliphatic ring.

With such a ring system, which is advantageously a bicyclic aliphatic ring system, a bulky side group may be provided in a simple and effective manner.

Of (meth)acryl monomers comprising such a bulky side chain, isobornyl(meth)acrylate is preferred.

Preferably, L is a linker of the formula (III)

$$-(R')_n O_m (R'')_p O_q- \quad (III)$$

wherein each R' and each R" are chosen independently from
  —$CH_2$— and —$CHR^{20}$— wherein $R^{20}$ is chosen from —H, and —$CH_3$, and wherein
  n is 0 to 5;
  m and q are independently of each other 0 or 1;
  p is 0 to 3;
  with the provision that
  if p is 0, q is also 0;
  if n is 0, m is also 0; and
  the total number of carbon- and oxygen atoms of the backbone of the linker L is 0 to 10, preferably 0 to 5.

Such spacer lengths are suitable for the protecting commercially important epoxy-group comprising first monomers such as GMA. If the total number of carbon- and oxygen atoms of the backbone of the linker L is zero (that is, n and p are 0), L represents a single bond, and in formula (I) the bulky group is directly linked to the C(O)O.

An important embodiment is characterized in that the first monomer is present in the copolymer in at least 1 mole %.

Thus, an adhesive composition is provided showing excellent properties, and which is in particular after cross-linking, little sensitive to ambient conditions. These mole percentages of the first monomer, advantageously a (meth)acryl monomer, allow the provision of glue compositions that do not rely on the formation of a chelate or otherwise explicitly require an external cross-linking agent to achieve cross-linking. In other words: The glue compositions are genuinely single component systems, not just from the point of view of the customer, but also for the manufacturer. The manufacturer enjoys the advantage of a simplified production and process control. The latter also applies to the user of the adhesive composition.

The first (meth)acryl monomer is preferably characterized in that the first (meth)acryl monomer comprising the epoxy group is of the general formula (IV),

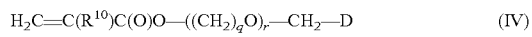

wherein
$R^{10}$ is H or $CH_3$;
q is 0 to 6 and r 0 or 1, with the provision that when q is 0 then r is 0;
D is an epoxy ring.

According to a preferred embodiment the first (meth)acryl monomer of the formula (IV) is chosen from glycidyl acrylate and glycidyl methacrylate (GMA).

The invention also relates to a method of applying an adhesive composition, said method being characterized in that the adhesive composition according to any of the preceding claims is applied onto a substrate under conditions at which the epoxy groups cross-link and solvent is eliminated.

The conditions for cross-linking are suitably heating to a temperature of, depending on the chosen first and third monomer, at least 80° C. When a catalyst is used, this temperature may be lower. However, when using a catalyst one of the advantages of the present invention is relinquished, i.e. a one component-system as discussed above. In the present invention, the use of a catalyst is, however, not excluded, because also in that case adhesive compositions having relatively high percentages of epoxide are possible thanks to the present invention. Suitable catalysts are, for example, benzyldimethyl amine, boriumtrifluoride.pyridine, and fosfonium salts.

Preferably heating is performed at a temperature above 110° C., allowing a quick and adequate cross-linking to be achieved.

Furthermore, the invention relates to a method of preparing of a pressure sensitive adhesive composition according to the invention, comprising a copolymer based on monomers which are independently of each other chosen from optionally substituted a) alkyl(meth)acrylate, b) aryl(meth)acrylate, c) vinyl alkanoate and d) vinyl lactam, wherein at least three monomers, in particular
1) a first monomer chosen from a) and b) as defined above, said first monomer having a side chain comprising an epoxy group,
2) a second monomer chosen from a) to d) as defined above, said second monomer having a side chain not comprising an epoxy group, and
3) a third monomer chosen from a) and b) as defined above, having the formula (I) as defined above
in the presence of a solvent suitable for the monomers, and are copolymerized at a temperature below 110° C., yielding a copolymer solution, wherein the ratio M13 of the first and third monomer used in the copolymerisation is in the range of 0.1 and 5.

This method is performed in a manner known in the art for forming glue compositions based on poly(meth)acrylate, wherein the concentrations and reaction conditions are chosen such that a copolymer is obtained having a molecular weight Mz in the range of 50,000 to 1,500,000, preferably between 100,000 and 1,500,000, more preferably 275,000 to 1,500,000. A suitable method is disclosed in, for example, U.S. Pat. No. 3,769,254.

Preferably, the ratio M13 is in the range between 0.2 and 1.5, and preferably between 0.3 and 1.

Preferably, the copolymerisation is performed at a temperature between 70-105° C., more preferably 75 to 95° C.

The most suitable temperature depends on the particular monomers and amounts thereof chosen, and a suitable temperature can easily be determined using routine experiments. If cross-linking occurs, as evidenced by gel formation, a lower temperature must be used. The temperature must be sufficient for the formation of copolymer.

This embodiment is particularly suitable for, for example, preparing a copolymer comprising glycidyl methacrylate and isobornyl(meth)acrylate as first and third monomer respectively, without undesirable cross-linking occurring during polymerisation and/or during storage.

Preferably, the copolymerisation is performed using a third (meth)acrylate monomer having a ring system B, wherein the ring system B comprises at least 1 aliphatic ring, and is more preferably as defined above for the pressure sensitive adhesive. For the sake of brevity, reference is made to the pressure sensitive adhesive composition defined above for other preferred embodiments of the method according to the invention.

For various purposes, the adhesive composition according to the invention may contain additives customary in the art. Advantageously, the adhesive composition contains a tackifier-system, suitably in a percentage by weight of 5 to 70% relative to the weight of the copolymer, advantageously 15 to 60% by wt.

The invention also relates to a pressure sensitive adhesive composition obtainable using the method according to the invention.

Finally, the invention relates to the use of a pressure sensitive adhesive composition according to the invention as a pressure sensitive adhesive.

The present invention will now be illustrated with reference to some examples.

A) PREPARATIONS

Example 1

A 2 liter reactor was charged with 157.9 grams of heptane, 156.2 grams of ethyl acetate, 306.1 grams of the monomer-solution described below and 15.05 grams of the initiator-solution described below. Under a $N_2$ atmosphere, the reactor content was heated to a reactor temperature of 82-85° C. After initiation 178.7 grams of monomer-solution were added over a period of 57 minutes and 60.45 grams initiator-solution (1.2 g AIBN (2,2'-azobisisobutyronitrile) in 99.52 g ethyl acetate) were added over a period of 87 minutes. After a reaction time of 90 minutes a mixture of 90.1 grams of heptane and 45.05 grams ethyl acetate was added over a period of 3 hours. The addition of solvent serves to control the viscosity of the solution and thus to achieve a gentle proceeding of the polymerisation and to avoid (local or not) temperature excursions. The temperature of the reactor was maintained for 6 hours in total. Mz: 935000 Da. M13=0.5.

The monomer-solution consisted of:

|  | Amount (grams) | Mole % | Monomer category |
|---|---|---|---|
| Monomers |  |  |  |
| 2-Ethylhexyl acrylate | 280 | 43 | 2 |
| Methyl acrylate | 96.9 | 32 | 2 |

-continued

| | Amount (grams) | Mole % | Monomer category |
|---|---|---|---|
| Acrylic acid | 25.4 | 10 | 2 |
| Glycidyl methacrylate | 4.5 | 1 | 1 |
| iso-Bornyl acrylate | 16 | 2 | 3 |
| Butyl acrylate | 50 | 11 | 2 |
| Solvent | | | |
| Ethyl acetate | 12 | | |

Note:
The monomer category refers to the first, second and third monomers as defined in the present application.

Example 2

A 2 liter reactor was charged with 157.9 grams of heptane, 156.2 grams of ethyl acetate, 306.1 grams of the monomer-solution described below and 15.05 grams of the initiator-solution described below. Under a $N_2$ atmosphere, the reactor content was heated to a reactor temperature of 82-85° C. After initiation 178.7 grams of monomer-solution over a period of 57 minutes were added and 60.45 grams of the initiator-solution (1.2 g AIBN in 99.52 g ethyl acetate) over a period of 87 minutes. After a reaction time of 90 minutes a mixture of 90.1 grams of heptane and 4.05 grams ethyl acetate was added over a period of 3 hours. The temperature of the reactor was maintained for 6 hours in total. Mz: 879000 Da. M13=0.33.

The monomer-solution consisted of:

| | Amount (grams) | Mole % | Monomer category |
|---|---|---|---|
| Monomers | | | |
| 2-Ethylhexyl acrylate | 280 | 43 | 2 |
| Methyl acrylate | 96.9 | 32 | 2 |
| Acrylic acid | 25.4 | 10 | 2 |
| Glycidyl methacrylate | 4.5 | 1 | 1 |
| Benzyl methacrylate | 16 | 3 | 3 |
| Butylacryllaat | 50 | 11 | 2 |
| Solvent | | | |
| Ethyl acetate | 12 | | |

Example 3

A 2 liter reactor was charged with 157.9 grams of heptane, 156.2 grams of ethyl acetate, 306.1 grams of the monomer-solution described below and 15.05 grams of the initiator-solution described below. Under a $N_2$ atmosphere, the reactor content was heated to a reactor temperature of 82-85° C. After initiation 178.7 grams of monomer-solution were added over a period of 57 minutes and 60.45 grams of the initiator-solution (1.2 g AIBN in 99.52 g ethyl acetate) was added over a period of 87 minutes. After a reaction time of 90 minutes a mixture of 90.1 grams of heptane and 45.05 grams ethyl acetate was added over a period of 3 hours. The temperature of the reactor was maintained for 6 hours in total. Mz: 934000 Da. M13=0.33.

The monomer-solution consisted of:

| | Amount (grams) | Mole % | Monomer category |
|---|---|---|---|
| Monomers | | | |
| 2-Ethylhexyl acrylate | 280 | 43 | 2 |
| Methyl acrylate | 96.9 | 32 | 2 |
| Acrylic acid | 25.4 | 10 | 2 |
| Glycidyl methacrylate | 4.5 | 1 | 1 |
| tetrahydrofurfuryl methacrylate | 16 | 3 | 3 |
| Butyl acrylate | 50 | 11 | 2 |
| Solvent | | | |
| Ethyl acetate | 12 | | |

Example 4

A 2 liter reactor was charged with 91.5 grams of vinyl acetate, 212 grams ethyl acetate, 177 grams of the monomer-solution described below and 10 grams of the initiator-solution described below. Under a N2 atmosphere, the reactor content was heated to a reactor temperature of 82-85° C. After initiation, 177 grams monomer-solution and 150 grams ethyl acetate were added over a period of 90 minutes and 80 grams of the initiator-solution (3 g AIBN in 97 g ethyl acetate) were added over a period of 180 minutes. The temperature of the reactor was maintained for 6 hours in total. Mz 942000 Da. M13=1.17.

The monomer-solution consisted of:

| | Amount (grams) | Mole % | Monomer category |
|---|---|---|---|
| Monomers | | | |
| 2-Ethylhexyl acrylate | 100 | 16 | 2 |
| Acrylic acid | 7.46 | 3 | 2 |
| Glycidyl methacrylate | 34.9 | 7 | 1 |
| iso-Bornyl acrylate | 45 | 6 | 3 |
| Butyl acrylate | 166.8 | 38 | 2 |

Reference Example 5

Compare With Examples 1 to 3

A 2 liter reactor was charged with 157.9 grams of heptane, 156.2 grams of ethyl acetate, 306.1 grams of the monomer-solution described below and 15.05 grams of the initiator-solution described below. Under a $N_2$ atmosphere, the reactor content was heated to a reactor temperature of 82-85° C. After initiation, 178.7 grams of monomer solution were added over a period of 57 minutes and 60.45 grams of the initiator-solution (1.2 g AIBN in 99.52 g ethyl acetate) were added over a period of 87 minutes. After a reaction time of 90 minutes a mixture of 90.1 grams of heptane and 45.05 grams ethyl acetate was added over a period of 3 hours. The temperature of the reactor was maintained for 6 hours in total. Mz 1020000 Da.

The monomer-solution consisted of:

|  | Amount (grams) | Mole % | Monomer category |
|---|---|---|---|
| Monomers |  |  |  |
| 2-Ethylhexyl acrylate | 280 | 42 | 2 |
| Methyl acrylate | 112.9 | 36 | 2 |
| Acrylic acid | 25.4 | 10 | 2 |
| Glycidyl methacrylate | 4.5 | 1 | 1 |
| Butyl acrylate | 50 | 11 | 2 |
| Solvent |  |  |  |
| Ethyl acetate | 12 |  |  |

Reference Example 6

Compare with Example 4

A 2 liter reactor was charged with 91.5 grams of vinyl acetate, 212 grams ethyl acetate, 177 grams of the monomer-solution described below and 10 grams of the initiator-solution described below. Under a $N_2$ atmosphere, the reactor content was heated to a reactor temperature of 82-85° C. After initiation, 177 grams monomer-solution and 150 grams ethyl acetate were added over a period of 90 minutes and 80 grams of the initiator-solution (3 g AIBN in 97 g ethyl acetate) were added over a period of 180 minutes. The temperature of the reactor was maintained for 6 hours in total. During the reaction a gel already formed.

The monomer-solution consisted of:

|  | Amount (grams) | Mole % | Monomer category |
|---|---|---|---|
| Monomers |  |  |  |
| 2-Ethylhexyl acrylate | 120 | 18 | 2 |
| Acrylic acid | 7.46 | 3 | 2 |
| Glycidyl methacrylate | 34.9 | 7 | 1 |
| Butylacryllaat | 198 | 42 | 2 |

Note:
In this table the total mole % is not equal to 100, because in addition vinyl acetate was used as a monomer.

B) INVESTIGATION OF THE STABILITY

In the present application, an adhesive composition is deemed stable, if the adhesive composition, even after a period of 8 weeks at 40° C. under exclusion of the atmosphere, doesn't form a gel. The Brookfield viscosities were measured using a Brookfield Synchro-lectic Viscometer (model LVT, Brookfield engineering laboratories, Stoughton, Mass., US) equipped with a LV3 spindle at 12 rpm. Under the conditions indicated for testing of the shelf-life the viscosity of the glue compositions according to the invention increased less than 5 times, which is considered very satisfactory.

Example 7

The copolymer solution prepared as in example 1 was mixed with a tackifier-solution (Foralyn 110, Eastman Chemicals, Kingsport, US) such that the ratio dry copolymer:dry tackifier was 5:1 (weight ratio). The prepared sample was left for a period of 8 weeks at a temperature of 40° C. The Brookfield viscosity was measured at the start of the test and after 8 weeks. During this period, the viscosity increased from 1000 mPa·s to 2000 mPa·s. Hence, the product is stable.

Example 8

The copolymer solution prepared in example 2 was mixed with a tackifier-solution such that the ratio dry copolymer:dry tackifier was 5:1 (weight ratio). The prepared sample was left for a period of 8 weeks at a temperature of 40° C. The Brookfield viscosity was measured at the start of the test and after 8 weeks. During this period, the viscosity increased from 760 mPa·s to 1800 mPa·s. Hence, the product is stable.

Example 9

The copolymer solution prepared in example 1 was left for a period of 8 weeks at a temperature of 40° C. The Brookfield viscosity was measured at the start of the test and after 8 weeks. During this period, the viscosity increased from 1560 mPa·s to 3800 mPa·s. Hence, the product is stable.

Example 10

The copolymer solution prepared in example 3 was left for a period of 8 weeks at a temperature of 40° C. The Brookfield viscosity was measured at the start of the test and after 8 weeks. During this period, the viscosity increased from 1000 mPa·s to 2400 mPa·s. Hence, the product is stable.

Example 11

The copolymer solution prepared in example 3 was mixed with a tackifier-solution such that the ratio dry copolymer:dry tackifier was 5:1 (weight ratio). The prepared sample was left for a period of 8 weeks at a temperature of 40° C. The Brookfield viscosity was measured at the start of the test and after 8 weeks. During this period, the viscosity increased from 800 mPa·s to 2000 mPa·s. Hence, the product is stable.

Example 12

The copolymer solution prepared in example 3 was left for a period of 8 weeks at a temperature of 40° C. The Brookfield viscosity was measured at the start of the test and after 8 weeks. During this period, the viscosity increased from 1000 mPa·s to 3100 mPa·s. Hence, the product is stable.

Example 13

The copolymer solution prepared in example 4 was left for a period of 8 weeks at a temperature of 40° C. The Brookfield viscosity was measured at the start of the test and after 8 weeks. During this period, the viscosity increased from 1300 mPa·s to 2500 mPa·s. Hence, the product is stable.

Example 14

The copolymer solution prepared in reference example 5 was left for a period of 8 weeks at a temperature of 40° C. The Brookfield viscosity was measured at the start of the test and after 8 weeks. During this period the product gelled. Hence, the product is not stable.

Example 15

The copolymer solution prepared in reference example 5 was mixed with a tackifier-solution such that the ratio dry copolymer:dry tackifier was 5:1 (weight ratio). The prepared sample was left for a period of 8 weeks at a temperature of 40° C. The Brookfield viscosity was measured at the start of the test and after 8 weeks. During this period the product gelled. Hence, the product is not stable.

Adhesion Testing

Example 16

The copolymer solution prepared in example 1 was mixed with a tackifier-solution such that the ratio dry copolymer:dry tackifier was 5:1 (weight ratio). The glue composition obtained was coated onto a 50 μm polyester film at a glue thickness of 65 g/m². This was dried and chemically cross-linked for 5 minutes at a temperature of 120° C.

The coating obtained was tested for its adhesion-properties according to the Finat method FTM1 on RVS, PE and PP test substrates. The results obtained are shown in the table below.

| Test substrate | 24 hours peel force N/2.5 cm |
|---|---|
| Steel | 25 |
| PE | 10 |
| PP | 19 |

The Finat testing methods used are disclosed in "pressure sensitive laminates" Suppliers and users technical manual. This handbook can also be found at http://www.finat.com/testm.html.

Example 17

The copolymer solution prepared in example 2 was mixed with a tackifier-solution such that the ratio dry copolymer:dry tackifier was 5:1 (weight ratio). The glue composition obtained was coated onto a 50 μm polyester film at a glue thickness of 65 g/m². This was dried and chemically cross-linked for 5 minutes at a temperature of 120° C.

The coating obtained was tested for its adhesion-properties according to the Finat ftm 1 method on RVS, PE and PP test substrates. The results obtained are shown in the table below.

| Test substrate | 24 hours peel force N/2.5 cm |
|---|---|
| Steel | 15 |
| PE | 10 |
| PP | 17 |

Example 18

The copolymer solution prepared in example 3 was mixed with a tackifier-solution such that the ratio dry copolymer:dry tackifier was 5:1 (weight ratio). The glue composition obtained was coated onto a 50 μm polyester film at a glue thickness of 65 g/m². This was dried and chemically cross-linked for 5 minutes at a temperature of 120° C.

The coating obtained was tested for its adhesion-properties according to the Finat ftm 1 method on RVS, PE and PP test substrates. The results obtained are shown in the table below.

| Test substrate | 24 hours peel force N/2.5 cm |
|---|---|
| Steel | 9 |
| PE | 10 |
| PP | 15 |

Cohesion Testing:

Example 19

The coating prepared in example 16 was tested for its cohesion properties according to the afera method 4102 and the Finat method ftm 8, where the latter was performed at 70° C. instead of at 23° C. The afera testing methods used are disclosed in "Afera test methods manual-2004 edition", and can also be found on http://www.afera.com/testm.html. Measured according to the afera method, the test coating could hold a weight of 8 kg over a period of more than 4 hours. Measured according to the Finat method, the test coating could hold a weight of 1 kg over a period of more than 150 hours at a temperature of 70° C.

Example 20

The copolymer solution prepared in reference example 5 was mixed with a tackifier-solution such that the ratio dry copolymer:dry tackifier was 5:1 (weight ratio). The glue composition obtained was coated onto a 50 μm polyester film at a glue thickness of 65 g/m². This was dried and chemically cross-linked for 5 minutes at a temperature of 120° C. Subsequently the prepared coating was tested for its cohesion properties according to the afera method and the Finat 70° C. method.

Measured according to the afera method, the test coating could not hold a weight of 8 kg over a period of more than 4 hours.

Measured according to the Finat method, the test coating could hold a weight of 1 kg over a period of less than 150 hours at a temperature of 70° C.

C) MOLECULAR WEIGHT DETERMINATIONS

Sample Pre-Processing:

0.2 to 0.5 grams of adhesive composition is weighed off. Subsequently, 25 ml THF is added and the mixture is shaken until a homogenous sample remains. This is filtered through a 0.45 μm Teflon filter for injection on a Waters Styragel HT column.

Molecular Weight Determination

The series of Waters HT-columns (HT2, HT3, HT4, HT5, HT6) was calibrated with polystyrene polymer standards (Readycal, polymer starlands service GmbH, Mainz, Germany) shown in the table below. Eluent: THF at 1 ml/min. Column temperature: 40° C.; Detector temperature: 35° C. (Waters 2410 RI detector). Injection volume: 200 μl. To determine a molecular weight a sample pre-processed as above under the same conditions as the standards (see table below) was applied onto the column. The molecular weight-indications in the present application relate, as indicated above, to the Mz molecular weight (in Dalton), and were determined using Waters Millennium software V.32.

| MP | MW | MN |
|---|---|---|
| 2180000 | 2000000 | 1800000 |
| 1000000 | 960000 | 930000 |
| 659000 | 644000 | 623000 |
| 246000 | 226000 | 214000 |
| 128000 | 125000 | 123000 |
| 67500 | 65000 | 64000 |
| 32500 | 32000 | 31000 |
| 18100 | 17400 | 16600 |
| 9130 | 8620 | 8260 |

-continued

| MP | MW | MN |
|---|---|---|
| 3770 | 3700 | 3470 |
| 1620 | 1560 | 1500 |
| 374 | 410 | 360 |

MP = peak-averaged molecular weight
MW = weight-averaged molecular weight
MN = number-averaged molecular weight

The invention claimed is:

1. A crosslinkable pressure sensitive adhesive composition comprising:
 (A) a tackifier;
 (B) a cross-linking agent; and
 (C) a crosslinkable copolymer in an inert solvent selected from the group consisting of ethyl acetate and heptane, wherein the crosslinkable copolymer is prepared by copolymerizing:
  (a) 1-7 mole % of a first monomer, which is a glycidyl acrylate or glycidyl methacrylate,
  (b) a combination of
   (i) 3-10 mole % of an acrylic acid; and
   (ii) 54-86 mole % a second monomer selected from the group consisting of 2-ethylhexyl acrylate, methyl acrylate, butyl acrylate and mixtures threof; and
  (c) 2-6 mole % of a third monomer selected from the group consisting of isobornyl acrylate, benzylmethacrylate, tetrahydrofurfuryl methacrylate and mixtures thereof;
 based on the total mole % of the copolymer;
 wherein the molar ratio M13 of the first monomer to the third monomer is in the range of 0.1 to 1.5;
 wherein the combined total weight percent of the (b)(i) acrylic acid and the (a) first monomer content ranges from 6.32 wt % to 11.96 wt %, based on the total weight of the copolymer;
  wherein the copolymer has a glass transition temperature (Tg) of 0° C. or less; and
  wherein the copolymer remain stable and does not form a gel after a period of 8 weeks at 40° C., under exclusion of atmosphere.

* * * * *